United States Patent Office 3,657,363
Patented Apr. 18, 1972

3,657,363
PROCESS FOR THE DEUTERATION OF THE HYDROXYL POSITION OF ORGANIC ALCOHOLS
Ernest A. Dorko, Huntsville, Ala., assignor to the United States of America as represented by the Secretary of the Army
No Drawing. Filed Sept. 15, 1967, Ser. No. 668,245
Int. Cl. C07c 31/12, 13/04
U.S. Cl. 260—642                                         1 Claim

ABSTRACT OF THE DISCLOSURE

A novel process for the preparation of organic alcohols in which the hydroxyl position contains a deuterium atom. The process involves adding a quantity of the alkali metal salt of an organoic alcohol (i.e., t-butyl alcohol) in small portions to a three-fold molar amount of deuterium oxide. The reaction mixture is stirred vigorously during the addition. The resulting mixture of deuterated alcohol, potassium deuteroxide and deuterium oxide (heavy water) is distilled. The appropriate alcohol fraction is separated in the distillation process and final traces of heavy water and water from the atmosphere are removed by passage of the fraction through barium oxide. The process represents a great simplification of the previous process.

DEDICATORY CLAUSE

The invention described herein may be manufactured, used, and licensed by or for the Government for governmental purposes without the payment to me of any royalty thereon.

BACKGROUND OF THE INVENTION

This invention relates to a simplified process for the preparation of organic alcohols in which the hydroxyl position contains a deuterium atom.

Deuterium is an isotope of hydrogen. Because of the kinetic isotope effect, studies of the chemical and physical (including vibrational spectra) properties of various hydrogen-containing organic compounds such as organic alcohols can be made by comparing a given compound having a standard hydrogen atom(s) with the correspond deuterated compound.

The previous process for the preparation of organic alcohols in which the hydroxyl position contains a deuterium atom is complicated.

Accordingly, it is the principal object of this invention to provide a simplified process for the preparation of organic alcohols in which the hydroxy position contains a deuterium atom.

SUMMARY OF THE INVENTION

The process of this invention involves adding a quantity of the alkali metal salt of an organic alcohol (i.e., t-butyl alcohol) in small portions to a three-fold amount of deuterium oxide. The reaction mixture is stirred vigorously during the addition. The resulting mixture of deuterated alcohol, potassium deuteroxide and deuterium oxide is distilled. The appropriate alcohol fraction is separated in the distillation process and final traces of water are removed by passage of the fraction through barium oxide.

DESCRIPTION OF THE PREFERRED EMBODIMENTS

Recently, a sample of 1,2-dideuterocyclopropene was required for an analysis of the vibrational spectra of cyclopropene. This necssitated the selective deuteration of the vinylic protons. Previous deuteration procedures had produced random deuteration of the cyclopropene (distribution of the deuterium in the molecule). See K. R. Wilberg, R. K. Barnes, and J. Albin, J. Am. Chem. Soc. 79, 4994 (1957) and D. J. Cram and B. Rickborn, J. Am. Chem. Soc. 83, 2178 (1961).

The vinyl position of cyclopropene can be selectively deuterated by taking advantage of the acidity of the vinylic protons. The process involves bubbling a sample of cyclopropene in a gas stream through a 10% solution of potassium t-butoxide in t-butyl alcohol-d (prepared as described hereinafter in accordance with this invention).

Mass spectral analysis demonstrates the incorporation of two deuterium atoms per molecule. The infrared spectrum shows that the vinylic positions were essentially completely deuterated while the methylenic position was essentially completely free of deuterium.

While it has been postulated that the vinylic protons are substantially more acidic than normal vinyl protons, (G. L. Closs, Proc. Chem. Soc., 1962, 152), and while this property has been used in the preparation of cyclopropene derivatives [G. L. Closs and L. E. Closs, J. Am. Chem. Soc. 83, 1003 (1961) and K. B. Wilberg, R. K. Barnes, and J. Albin, J. Am. Chem. Soc. 19, 4994 (1957)], there has been no direct evidence to indicate that the equilibrium shown in Eq. 1 can be established:

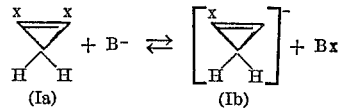

(Ia)                    (Ib)

In Formula 1a, $x=H$; $B^-=$base ion
In Formula 1b, $x=D$; In compound B$x$, $x=H$ The recovery and characterization of 1,2-dideuterocyclopropene (formed from (Ib) by additional deuteration wherein vinylic proton is replaced with deuterium) is direct evidence which establishes that this equilibrium does exist.

EXPERIMENTAL PROCEDURE 1,2-dideuterocyclopropene-cyclopropene is first prepared. See G. L. Closs and K. D. Krantz, J. Org. Chem. 31, 638 (1965). A 1-cc. portion of this material is allowed to pass through a U-tube filled with a 10% solution of potassium t-butoxide in t-butyl alcohol-d (prepared as described hereinafter). The gas stream (on emerging from the base solution) is passed through a U-tube maintained at 0° C., to condense out the deuterated and protonated alcohol mixture, and through a U-tube maintained at 196° C., to condense out the dideuterocyclopropene. Five passes through the base solution are sufficient to completely replace the vinylic protons. The mass spectral cracking patterns for the protonated and for the dideuterated compounds are shown in the following table.

MASS SPECTRUM OF CYCLOPROPENE AND 1,2-DIDEUTEROCYCLOPROPENE

| Mass/electronic charge | Cyclopropene relative intensity | 1,2-dideutero-cyclopropene relative intensity |
|---|---|---|
| 12 | 2.2 | 2.9 |
| 13 | 2.4 | 2.0 |
| 14 | 2.7 | 4.9 |
| 15 | 0.8 | 2.1 |
| 19 | 4.5 | 1.7 |
| 19½ | 2.5 | 4.0 |
| 20 | 0.7 | 3.1 |
| 20½ | | 1.4 |
| 24 | 0.9 | 1.2 |
| 25 | 2.4 | 1.8 |
| 26 | 4.3 | 4.7 |
| 27 | 3.9 | 5.1 |
| 36 | 4.7 | 9.4 |
| 37 | 17.3 | 14.2 |
| 38 | 32.8 | 30.6 |
| 39 | 100.0 | 55.8 |
| 40 | 56.8 | 99.5 |
| 41 | 5.8 | 100.0 |
| 42 | 1.7 | 58.7 |
| 43 | | 2.5 |

The solid phase infrared spectrum of 1,2-dideuterocyclopropene shows that the absorption bands due to methylenic C—H stretch at 2982 cm.$^{-1}$ and 2997 cm.$^{-1}$ occur at the same frequency as for Ia. However, the bands at 3158 cm.$^{-1}$ and 3124 cm.$^{-1}$ due to the vinylic C–H stretch have shifted to 2480 cm.$^{-1}$ and 2430 cm.$^{-1}$.

The t-butyl alcohol-d used above can be prepared as described hereafter (in accordance with this invention).

t-Butyl alcohol-d: Potassium t-butoxide (Research Corporation, Callery, Pa., 44.8 g., 0.4 mole) is added in small portions to 24.0 g. (1.2 moles) of $D_2O$. The reaction mixture is stirred vigorously during the addition which is accomplished in a nitrogen atmosphere. The resulting mixture is distilled. The fraction boiling at 82° C. is dried over barium oxide to remove final traces of $D_2O$. This procedure gives 29.0 g. (97%) of the deuterated alcohol. Mass spectral analysis shows it to be free of $D_2O$. Nuclear magnetic resonance and infrared analysis show that the hydroxyl position is 98% deuterated.

A three-fold molar amount of deuterium oxide (relative to the alkali metal salt) is optimum because thereby a concentrated solution of alkali metal deuteroxide is obtained (which is necessary to effect stirring and ultimate distillation, since the alkali metal deuteroxide is insoluble in the deuterated alcohol product).

In general, the process of this invention can be employed to prepare organic alcohols in which the hydroxyl position contains a deuterium atom; e.g., R–O–D (R represents any aliphatic or aromatic group formed from carbon, hydrogen or other appropriate atoms).

Salts of other alkali metals (e.g., sodium, lithium and cesium) may also be employed.

I claim:

1. A process for the deuteration of the hydroxyl position of t-butyl alcohol comprising the steps of reacting potassium t-butoxide with deuterium oxide in molar amount of about 1 of said potassium t-butoxide to molar amount of about 3 of said deuterium oxide, thereby forming a reaction mixture including t-butyl alcohol-d, said potassium t-butoxide being added in small portions to said deuterium oxide, and thereafter separating said t-butyl alcohol-d from said reaction mixture, said t-butyl alcohol-d being 98% deuterated.

References Cited

UNITED STATES PATENTS

| 2,491,033 | 12/1949 | Byrns et al. | 260—632 A |
| 3,320,309 | 5/1967 | Schlack et al. | 260—642 |

OTHER REFERENCES

Jakli, et al.: "Chem. Abstracts," vol. 63 (1965), p. 17874.

Vogel: "Practical Organic Chemistry," 3rd. ed. (1957), pp. 5, 93, 167, 414, 415.

Jakli, et al., "Kozponti, Fizikai Kutato Intezet," Kozlemenyei, vol. 13, No., 4 (1965), pp. 235 and 239.

BERNARD HELFIN, Primary Examiner

J. E. EVANS, Assistant Examiner

U.S. Cl. X.R.

23—184; 260—618 R, 666 P